United States Patent

Parks et al.

[11] Patent Number: 5,708,794
[45] Date of Patent: Jan. 13, 1998

[54] MULTI-PURPOSE USAGE OF TRANSACTION BACKOFF AND BUS ARCHITECTURE SUPPORTING SAME

[75] Inventors: Terry J. Parks, Round Rock; Darius D. Gaskins; Charles Zeller, both of Austin, all of Tex.

[73] Assignee: Dell USA, L.P., Round Rock, Tex.

[21] Appl. No.: 692,326

[22] Filed: Aug. 5, 1996

Related U.S. Application Data

[63] Continuation of Ser. No. 104,225, Aug. 10, 1993, abandoned.

[51] Int. Cl.⁶ .................................................. G06F 13/00
[52] U.S. Cl. .................. 395/481; 395/288; 395/290; 395/292; 395/307; 395/308; 395/309; 395/859; 395/873; 395/726; 395/728; 364/240.3; 364/238.6; 364/239; 364/240.2
[58] Field of Search .................................. 395/306–309, 395/290, 292, 250, 288, 481, 859, 873, 726, 728; 364/240.3, 238.6, 239, 240.2

[56] References Cited

U.S. PATENT DOCUMENTS

| | | | |
|---|---|---|---|
| 5,101,479 | 3/1992 | Baker et al. | 395/325 |
| 5,265,211 | 11/1993 | Amini et al. | 395/856 |
| 5,367,695 | 11/1994 | Narad et al. | 395/800 |
| 5,414,820 | 5/1995 | McFarland et al. | 395/325 |
| 5,544,346 | 8/1996 | Amini et al. | 395/481 |

FOREIGN PATENT DOCUMENTS 0369264  5/1990  European Pat. Off. .

*Primary Examiner*—Tod R. Swann
*Assistant Examiner*—Denise Tran
*Attorney, Agent, or Firm*—Skjerven, Morrill, MacPherson, Franklin & Friel, L.L.P.; Stephen A. Terrile

[57] ABSTRACT

A digital processor system is disclosed that employs a bus bridge interfacing a primary bus to a secondary bus and which includes a transaction backoff signal line that provides an economical method of providing split transactions between the busses, of preventing deadlock situations between the busses, and of providing strong lock ordering across the busses. A primary bus master is backed-off the bus if it is attempting to access a device resident on the secondary bus and if mastership of the secondary bus cannot be attained by the bus bridge within a certain latency. The bus bridge further implements a method of prefetching read data from a device resident on the secondary bus in response to a primary bus master being backed-off the primary bus during a read operation.

10 Claims, 3 Drawing Sheets

MULTI-PURPOSE USAGE OF TRANSACTION BACKOFF AND BUS ARCHITECTURE SUPPORTING SAME

This application is a continuation of application Ser. No. 08/104,225, filed Aug. 10, 1993 now abandoned.

BACKGROUND OF THE INVENTION

1. Field of the Invention

This invention relates to digital processor systems, and more particularly to those digital processor systems incorporating a bus bridge to provide an interface between independent busses.

2. Description of Related Art

High performance processor systems frequently incorporate more than one system bus. This provides an underlying performance capability offered by a high performance bus architecture while at the same time promoting compatibility with older and frequently lower performance bus architectures. Additionally, a system incorporating an older bus architecture allows a processor system to take advantage of a vast array of readily available and sometimes lower cost peripherals, while still preserving an otherwise high performance system.

Many bus architectures allow more than one potential device resident on the bus to initiate an operation on the bus. A device which can initiate a bus operation is frequently termed a bus master. A device responding to a bus operation acts as a bus slave. A given device which may act at times as a bus master and at other times as a bus slave, is nonetheless frequently known as a bus master. In a bus architecture that supports multiple bus masters, when a bus master desires to initiate an operation, the bus master requests ownership of the bus. Requests from one or more bus masters are arbitrated, and one is granted ownership of the bus to become the current bus master and can proceed to initiate the desired operation. At any given time, at most only one bus master can be the current bus master. During this time, other bus masters must wait until the current bus master relinquishes ownership of the bus.

Bus backoff provides the means to force a current bus master to terminate an initiated operation without a data transfer, thus requiring the bus master to re-arbitrate for the bus and to re-initiate the operation after again gaining ownership of the bus. For example, this occurs in systems adhering to the MESI (Modified Exclusive-Shared-Invalid) protocol to inject write-backs of modified cache lines before a requesting device is allowed to read the cache, thus ensuring cache coherency. The bus backoff may indicate to a current bus master that the targeted slave device is not capable of performing the operation initiated. Bus backoff may also indicate that an operation should be pre-empted by another bus master attempting to gain ownership of the bus.

Several different system busses in current use provide strong lock ordering for transactions between devices resident on the bus. When a current bus master locks the bus, the other bus masters on the bus are prevented from preempting the current bus master until the bus is relinquished by the current bus master.

In a system with two separate busses, each capable of arbitration for bus ownership between multiple bus masters, several problems can arise. For instance, if a bus master on the first bus requests an operation requiring a slave device on the second bus to respond, while at the same time a bus master on the second bus requests an operation requiring a slave device on the first bus to respond, a deadlock situation occurs. Neither operation can proceed since each bus master is waiting for the other to relinquish ownership before its requested operation can proceed.

A similar situation occurs when a current bus master on the first bus tries to lock the bus for an operation during a single bus tenure which may require access to, and consequently bus ownership of, the second bus. If the second bus is owned by a different bus master who is trying to get access to the first bus, and if the current bus master on the first bus will be unable to gain ownership of the second bus, the operation may result in deadlock.

Additionally, if the two busses in such a system are capable of different performance, severe penalties can result if the faster bus is constrained to operate at the speed of the slower bus whenever a device from one bus is responding to a requesting device on the other. In other words, if the busses together are limited in performance to the speed of the slower of the two busses whenever a communication occurs between a device on each bus, then the performance of the overall system may suffer greatly and any additional bandwidth available on the higher performance bus is wasted.

For this and other reasons, some systems support split transactions. In a system which supports split transactions, several operations may be initiated by a current bus master, and queued for completion at a later time. This frees the bus for other transactions during times when the bus would otherwise likely be waiting for the queued operations to complete. The mechanisms used to provide for split transactions, however, have typically introduced complicated and cumbersome requirements upon bus interface hardware and bus protocols.

SUMMARY OF THE INVENTION

An object of the present invention is providing high performance computer system features to low cost computer systems.

Advantages of the present invention in a high performance computer system having plural busses include the prevention of deadlocks between the busses, the provision of strong lock ordering across the busses, and the facilitation of split transactions between the busses. Each is provided in a convenient manner requiring little dedicated hardware, and in such a way as to present a straightforward extension of mechanisms and protocols typically already in place on one bus of the computer system to include similar operations for at least one other bus of the computer system.

Accordingly, these and other objects and advantages are achieved in a bus bridge which provides an interface between a first bus and a second bus of a processor system, a method of responding to a request from a bus master having ownership of the first bus to read data from a device residing on the second bus, which requires ownership of the second bus by the bus bridge, including the steps of asserting a backoff signal on the first bus, thereby causing the bus master on the first bus to postpone the request to read data and to relinquish ownership of the first bus; de-asserting the backoff signal on the first bus subsequent to the asserting step; requesting ownership of the second bus subsequent to the asserting step; issuing to the device residing on the second bus, when ownership of the second bus is granted as a result of the ownership requesting step, the request to read the data; receiving the data from the device residing on the second bus in response to the issuing step; storing the data received in the receiving step in a prefetch buffer within the bus bridge; waiting, subsequent to the storing step, for the bus master on the first bus to regain ownership of the first bus and to subsequently request to read the data from the device residing on the second bus; and providing the data stored in the prefetch buffer of the bus bridge to the bus master on the first bus in response to the subsequent request from the bus master on the first bus.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings, in the several figures of which like reference numerals identify identical elements, and wherein:

DETAILED DESCRIPTION

Figure 1:
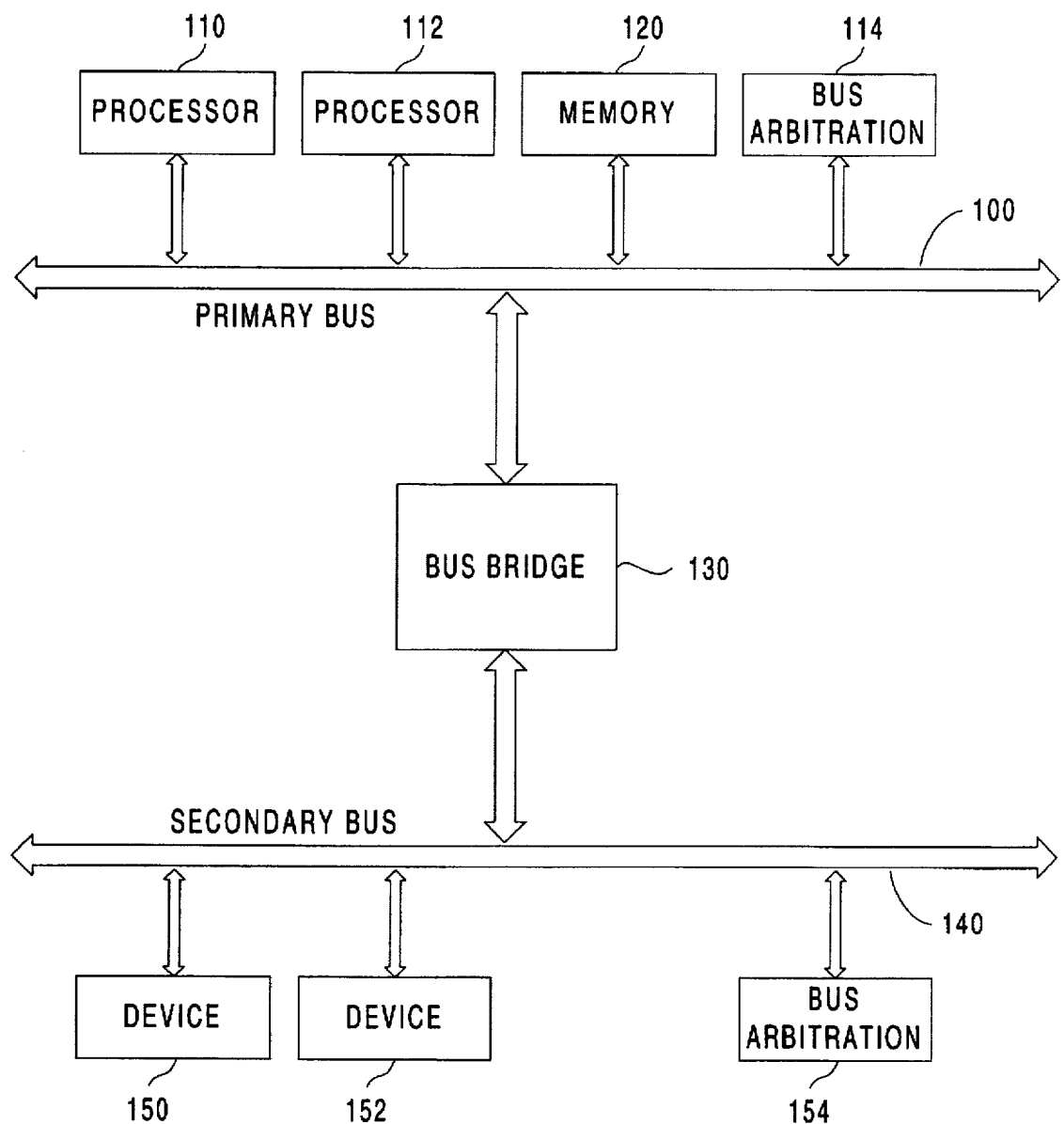
FIG. 1 is a schematic diagram illustrating a system utilizing two separate busses with a bus bridge providing an interface between the two busses.

FIG. 1 shows a processor system incorporating a primary bus 100 and a secondary bus 140. "Primary bus" refers to a bus that usually has one or more processors connected to it, and is usually faster than the "secondary bus". Coupled to the primary bus 100 is a first processor 110 and a second processor 112 as well as a shared memory block 120. Coupled to the secondary bus 140 is a first device 150 and a second device 152. Coupling the primary bus 100 to the secondary bus 140 is a bus bridge 130. Bus arbitration circuits 114 and 154 respectively arbitrate competing requests for ownership of the primary and secondary busses 100 and 140 in a manner well known in the art.

Figure 2:
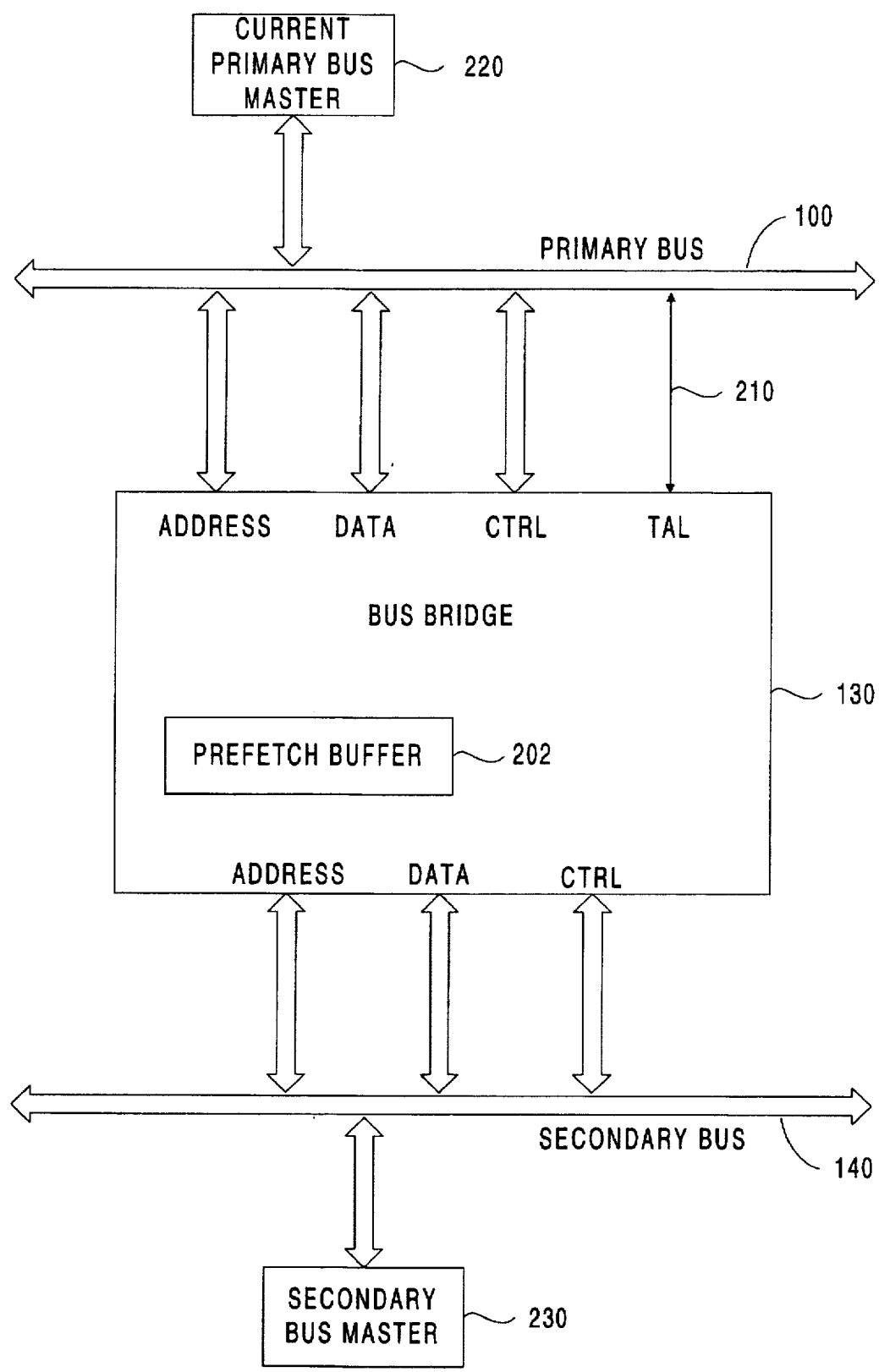
FIG. 2 is a schematic diagram of the bus bridge shown in FIG. 1, and incorporating a bus backoff signal in accordance with the current invention.

A block diagram of the bus bridge 130 is shown in FIG. 2. A TAL signal line 210 ("Try Again Later"), which is included in the control bus portion of the primary bus 100, is shared by all devices residing on the primary bus 100. Assertion of the TAL signal on the line 210 by the bus bridge 130 prevents deadlocks between the primary and secondary busses 100 and 140, provides strong lock ordering between the primary and secondary busses 100 and 140, and facilitates split transactions between the primary and secondary busses 100 and 140, all in a convenient manner requiring little dedicated hardware.

If the bus bridge 130 receives an operation request from a current bus master on the primary bus 100 (e.g. a current primary bus master 220) which requires ownership of the secondary bus 140 by the bus bridge 130 for the operation to complete, the current primary bus master 220 is backed off by the assertion of the TAL signal if the secondary bus 140 is currently owned by a bus master other than the bus bridge 130. If the secondary bus 140 is not owned by any other bus master, then the bus bridge 130 requests ownership of the secondary bus 140. This request is arbitrated with any other requests for ownership of the secondary bus 140 by other bus masters. If the ownership of the secondary bus 140 is granted to the bus bridge 130 within a certain time, the TAL signal remains deasserted and the requested operation proceeds. Otherwise the bus bridge 130 asserts the TAL signal, thus forcing the current primary bus master 220 to relinquish ownership of the primary bus 100. The certain time chosen is typically kept short to avoid having the current primary bus master 220 wait any longer than necessary before relinquishing the primary bus 100 for other use. This bus master must then re-arbitrate for the primary bus 100, and re-issue the operation request after gaining bus ownership once again. By asserting the TAL signal in this fashion, the bus bridge 130 prevents a deadlock situation where the current primary bus master 220 is stalled waiting for ownership of the secondary bus 140. Hence, the assertion of the TAL signal by the bus bridge 130 in a system in which the primary bus 100 is much higher performance than the secondary bus 140 prevents stalling of the primary bus 100 and the resultant waste of primary bus bandwidth.

The assertion of the TAL signal by the bus bridge 130 provides strong lock ordering across both the primary and secondary busses 100 and 140. The bus locking protocol of the primary bus 100 is extended across the bus bridge 130 to assure control of the secondary bus 140 as well, without using complicated request protocols or extra dedicated hardware.

If the current primary bus master 220 tries to lock the primary bus 100 for a bus tenure during which the current primary bus master 220 may seek to access devices on the secondary bus 140, the bus bridge 130 determines whether the secondary bus 140 is currently owned by a bus master other than the bus bridge 130. If so, the bus bridge 130 asserts the TAL signal, thus forcing the current primary bus master 220 to relinquish the primary bus 100 and try again later. If the secondary bus 140 is not currently owned by any bus master, then the bus bridge 130 requests ownership of the secondary bus 140. If granted ownership within a certain time, the bus bridge 130 acknowledges the primary bus lock request by leaving the TAL signal deasserted to allow the locked primary bus tenure to proceed. Since the bus bridge 130 then owns the secondary bus 140, any operation requests from the current primary bus master 220 to any device resident on the secondary bus 140 will proceed without delay.

Figure 3:
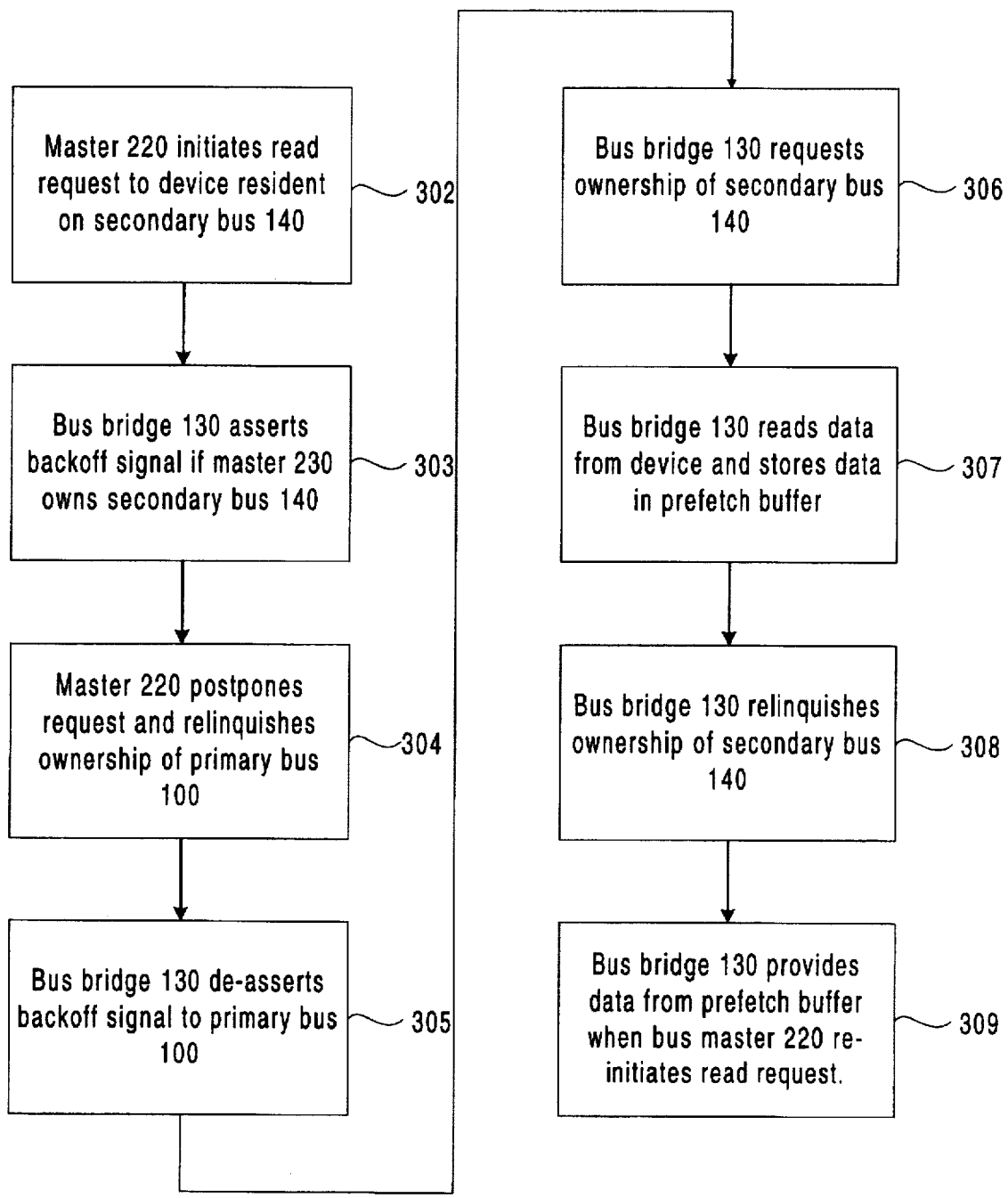
FIG. 3 is a flow diagram depicting operation of the system when a current primary bus master attempts to read data from a device resident on a secondary bus.

Additionally, the assertion of the TAL signal by the bus bridge 130 allows split transactions between devices resident on different busses. FIG. 3 is a flow diagram depicting operation of the processor system when the current primary bus master 220 attempts to read from a device resident on secondary bus 140. Referring collectively to FIGS. 2 and 3, the current primary bus master 220 requests an operation to read from a device which is resident on the secondary bus 140, the bus bridge 130 asserts the TAL signal to force the current primary bus master 220 to abort the read operation if secondary bus 140 is currently owned by secondary bus master 230 (steps 302 and 303). The current primary bus master 220 relinquishes the primary bus 100, and must re-arbitrate later (steps 304). The bus bridge 130 deasserts the TAL signal to the primary bus (step 305). However, the bus bridge 130 then requests ownership of the secondary bus 140 (steps 304). When ownership is granted, the bus bridge 130 proceeds to issue the previously requested read operation to the device resident on the secondary bus 140 and stores the data in a prefetch buffer 202 within the bus bridge 130 (steps 304). When the read operation and data storage is complete, the bus bridge 130 relinquishes ownership of the secondary bus 140 (step 308). When the original read operation request is subsequently re-issued by the current bus master 220, the bus bridge 130 responds directly with the data from the prefetch buffer 202 without again having to gain ownership of the secondary bus 140 (step 309). If the read data is not yet present in the prefetch buffer 202 when the subsequent read request is re-issued, the bus bridge 130 asserts the TAL signal again to back the transaction off. Transactions are backed off as many times as is necessary until the read data is available or until the secondary bus 140 is owned by the bus bridge 130. Using the TAL signal, a split read transaction is accomplished without any burdensome queuing mechanism or without special protocols needed to initiate such a split transaction.

The use of the bus bridge 130 having the capability of asserting and deasserting the TAL signal is particularly advantageous in systems having a primary bus of much higher bandwidth than a secondary bus. For example, the primary bus 100 may be a high-speed 64-bit bus optimized for multiple independent processors such as the i486™ microprocessor and the Pentium™ microprocessor, available from Intel Corporation of Santa Clara, Calif. Typically, each independent microprocessor acts as a bus master to common blocks of memory and other shared resources on the primary bus 100, while the secondary bus 140 may be the industry standard ISA, EISA, or PCI ISA (Industry Standard Architecture), EISA (Extended Industry Standard Architecture), or PCI (Peripheral Component Interconnect) busses. Moreover, a system may include plural secondary busses and additional bus bridges substantially identical to the bus bridge 130, one interfacing a primary bus to, for example, an EISA bus, and another interfacing the primary bus to, for example, a PCI bus. Alternatively, a single bus bridge such as the bus bridge 130 can be used to interface a primary bus to a secondary bus architecture which is mappable to any number of desirable bus architectures. The TAL signal is used to backoff a primary bus operation when securing the ownership of the secondary bus, which may be needed to complete the operation, cannot be timely assured. In this way, other primary bus masters can vie for the ownership of the primary bus and direct operations on the primary bus without wasting the bandwidth of the primary bus, particularly since the latency until secondary bus ownership is available to the bus bridge may be much longer than similar latencies for the primary bus. However, the principles discussed above apply equally well to systems where the performance of the secondary bus is similar to or even identical with the performance of the primary bus. The primary and secondary busses may also be identical independent busses.

While the invention has been described with respect to the embodiments set forth above, the invention is not necessarily limited to these embodiments. Various modifications, improvements, and additions are possible. For example, the invention is not necessarily limited to any particular bus architecture. Moreover, other multiple-bus transactions not described above may utilize a backoff signal in the fashion described above to achieve similar results. It is therefore intended to cover in the appended claims all modifications, variations, and improvements which fall within the true spirit and scope of the invention. Accordingly, other embodiments, not described herein are not necessarily excluded from the scope of the invention, which is defined by the following claims.

What is claimed is:

1. A method for responding to a read request from a first bus master having ownership of a first bus of a processor system to read data from a device residing on a second bus of the processor system, the method comprising the steps of:

providing a bus bridge as the interface between the first bus and the second bus, the bus bridge including a prefetch buffer such that the first bus master need never have ownership of the second bus in order to receive data from the device residing on the second bus;

initiating the read request by the first bus master; detecting, by the bus bridge, whether a second bus master resident on the second bus currently owns the second bus;

asserting, by the bus bridge, a backoff signal on the first bus in response to the bus bridge detecting that the second bus master currently owns the second bus;

postponing the read request and relinquishing ownership of the first bus by the first bus master in response to the asserted backoff signal;

de-asserting the backoff signal on the first bus by the bus bridge before requesting ownership of the second bus;

requesting ownership of the second bus by the bus bridge;

issuing, by the bus bridge, the read data request to the device residing on the second bus when ownership of the second bus is granted to the bus bridge as a result of the ownership requesting step;

receiving, by the bus bridge, the requested data from the device residing on the second bus;

storing the received data in the prefetch buffer within the bus bridge;

relinquishing ownership of the second bus by the bus bridge;

waiting, subsequent to the second bus ownership relinquishing step, for the first bus master to regain ownership of the first bus and to subsequently re-initiate the read request to read data from the device residing on the second bus; and providing the data stored by the bus bridge in the prefetch buffer to the first bus master in response to the re-initiated read request by the first bus master.

2. A method as in claim 1 wherein the first bus is a multi-processor bus which implements a MESI protocol for maintaining cache coherency.

3. A method as in claim 1 wherein the second bus has a peak bandwidth similar to that of the first bus.

4. A method as in claim 1 wherein the second bus has a peak bandwidth lower than that of the first bus.

5. A method as in claim 1 wherein the second bus is chosen from the group consisting of the PCI bus, EISA bus, and ISA bus.

6. A method for responding to a read request from a first bus master having ownership of a first bus of a processor system to read data from a device residing on a second bus of the processor system, the method comprising the steps of:

providing a bus bridge interface means for requesting, storing, and transferring data requested by the first bus master having ownership of the first bus of a processor system to allow data received from a device residing on the second bus of the processor system to the first bus master without requiring the first bus master to have ownership of the second bus;

initiating the read request by the first bus master;

detecting, by the bus bridge interface means, whether the second bus master resident on the second bus currently owns the second bus;

asserting, by the bus bridge interface means, a backoff signal on the first bus in response to the bus bridge interface means detecting that the second bus master currently owns the second bus;

postponing the read request and relinquishing ownership of the first bus by the first bus master in response to the asserted backoff signal;

de-asserting the backoff signal on the first bus by the bus bridge interface means;

requesting ownership of the second bus by the bus bridge interface means;

issuing, by the bus bridge interface means, the read data request to the device residing on the second bus when ownership of the second bus is granted to the bus bridge interface means as a result of the ownership requesting step;

receiving, by the bus bridge interface means, the requested data from the device residing on the second bus;

storing the received data in a prefetch buffer within the bus bridge interface means;

relinquishing ownership of the second bus by the bus bridge interface means;

waiting, subsequent to the second bus ownership relinquishing step, for the first bus master to regain ownership of the first bus and to subsequently re-initiate the read request to read data from the device residing on the second bus; and providing the data stored by the bus bridge interface means in the prefetch buffer to the first bus master in response to the re-initiated read request by the first bus master.

7. A method as in claim 6 wherein the first bus is a multi-processor bus which implements a MESI protocol for maintaining cache coherency.

8. A method as in claim 6 wherein the second bus has a peak bandwidth similar to that of the first bus.

9. A method as in claim 6 wherein the second bus has a peak bandwidth lower than that of the first bus.

10. A method as in claim 6 wherein the second bus is chosen from the group consisting of the PCI bus, EISA bus, and ISA bus.

* * * * *